United States Patent [19]

Rice et al.

[11] 3,947,780
[45] Mar. 30, 1976

[54] ACOUSTOOPTIC MODE-LOCKER FREQUENCY DOUBLER

[75] Inventors: Robert R. Rice; Gordon H. Burkhart, both of St. Louis County, Mo.

[73] Assignee: McDonnell Douglas Corporation, St. Louis, Mo.

[22] Filed: Oct. 21, 1974

[21] Appl. No.: 516,409

[52] U.S. Cl. ........................ 331/94.5 M; 350/160 R
[51] Int. Cl.² ............................................. H01S 3/10
[58] Field of Search......... 331/94.5; 350/160 R, 172

[56] References Cited
UNITED STATES PATENTS

| | | | |
|---|---|---|---|
| 3,611,231 | 10/1971 | Burke | 331/94.5 N |
| 3,648,193 | 3/1972 | Foster et al. | 331/94.5 C |

*Primary Examiner*—William L. Sikes
*Attorney, Agent, or Firm*—Charles B. Haverstock

[57] ABSTRACT

An improved laser construction having relatively simple single element means located in the laser cavity for simultaneously mode-locking and frequency doubling the laser output, said single element means including a crystal such as a non-linear barium sodium niobate (BSN) crystal properly excited to achieve acoustooptic loss modulation as well as to mode-lock the laser output, and means for locating the crystal within the laser resonator cavity.

20 Claims, 5 Drawing Figures

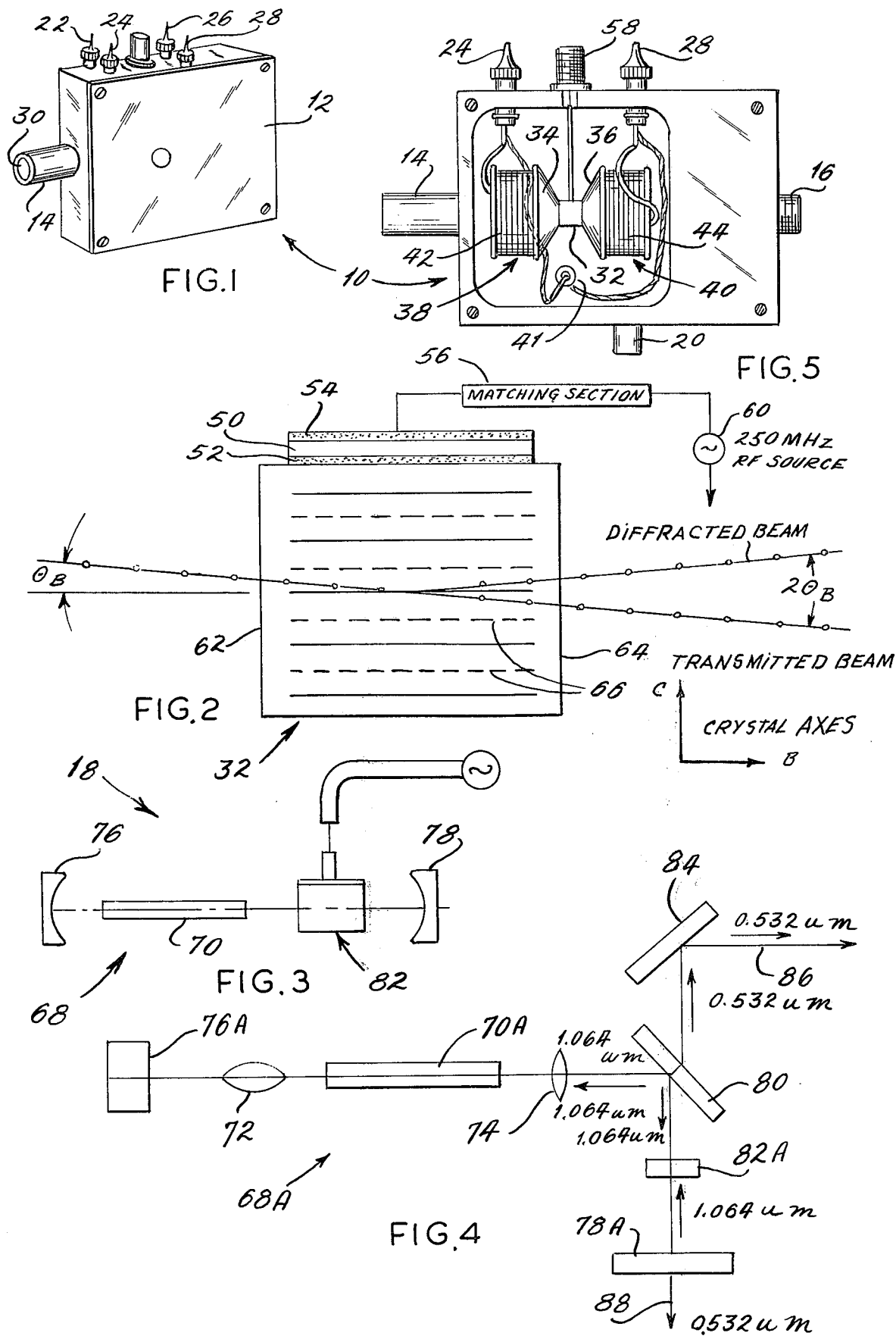

ACOUSTOOPTIC MODE-LOCKER FREQUENCY DOUBLER

Various constructions of mode-locked lasers and various constructions of frequency doubling devices for doubling the output frequency of lasers are well known in the art and are available commercially. Mode-locking is a process whereby a laser is made to emit a repetitive train of short pulses at a relatively high repetition frequency. Mode-locking occurs when a loss modulator or phase modulator is placed within a laser cavity and driven at a frequency equal to the axial cavity mode spacing. For example, mode-locking occurs when the laser frequency $F = c/2l$, where $c$ is the speed of light and $l$ is the optical length of the laser cavity. While either loss modulation or phase modulation can be used to mode-lock a laser, there are difficulties encountered in the use of phase modulation to mode-lock a laser such as a neodymium:yttrium-aluminum-garnet (Nd:YAG) laser. The more serious problems encountered when using phase modulation include objectionable phase state switches and other instabilities typically observed in series pulse stretching which occurs when the laser output is also frequency doubled. For these and other reasons the use of phase modulators as a means to mode-lock and frequency double has not been successful and has not been widely used. In the present device such means have been replaced by the use of loss modulation means. The present means accomplish mode-locking and frequency-doubling using a single properly located crystal, preferably a barium sodium niobate (BSN) crystal although other crystals can also be used including for example lithium niobate crystals as well as others which will be described. BSN crystals are usually preferred, however, because they have better non-linearity characteristics. In prior constructions such means were made to function as a phase modulator through application of an electrooptic effect, and these devices functioned as a laser frequency doubler through their non-linear optical effect, but never in the past has such a device simultaneously functioned as both a mode-locker and as a frequency doubler. In the present device, on the other hand, a single BSN or other non-linear crystal is all that is required, and as will be explained hereinafter it simultaneously produces both of the desired effects.

The closest known prior art is U.S. Pat. No. 3,648,193 issued to Foster et al which covers a mode-locked, frequency doubled laser. The approach disclosed in the Foster et al patent has the deficiencies cited above including the fact that it uses phase modulation which produces undesirable phase state switches and other instabilities and it produces serious objectionable pulse stretching which occurs when the frequency doubling takes place. Other attempts to produce the desired results have used a separate non-linear crystal and a loss modulator, but unfortunately commercially available acoustooptical loss modulators which operate at frequencies in the range of several hundred MegaHertz (MHz) are inefficient and produce low modulation depth, both of which are serious if not fatal disadvantages. Furthermore, in all known prior attempts to solve the named shortcoming, two intercavity laser components are required including a non-linear crystal cavity and an acoustooptical loss modulator cavity, and in these devices, each of the elements employed contribute to the cavity losses thereby working a further serious usually fatal handicap to these devices and also increases the size, complexity and cost of such devices. The most serious problems encountered in the dual cavity, dual element constructions were the wide pulses that were produced and the unstable operation which resulted from the low modulation depth available. Therefore, all known prior art constructions including those that are phase modulators and those that use two components, have been unsatisfactory for many purposes including use in space communication systems and the like. The low modulation depth characteristics of the known devices have been especially limiting.

The present construction overcomes these and other disadvantages and shortcomings of the prior art by teaching the construction and operation of a combination mode-locker and frequency doubler unit using a single crystal such as a single BSN crystal mounted in a laser cavity. The use of a single crystal properly excited to achieve acoustooptic loss modulation as well as to mode-lock the laser is at the heart of the present improved construction. The construction of an acoustooptic loss modulator usually also involves a difficult and costly procedure as compared to use of an electrooptic phase modulator. Therefore, while a number of attempts have been made to build and operate a mode-locked, frequency doubled Nd:YAG laser using a single crystal as a phase modulator and frequency doubler, the present construction is the first so far as known that uses a non-linear frequency doubling BSN or like crystal as an acoustooptic, rather than as an electrooptic modulator. The fact that an acoustooptic modulator serves both to mode-lock and to double the frequency of a laser gives it distinct advantages over the prior devices including those discussed above. Partly this is because it enables the laser to be mode-locked and frequency doubled by a single component located within the resonator cavity thereby substantially reducing the resonator loss while simplifying the laser design. These advantages are substantial especially when incorporated into a laser transmitter designed for use in a communication system wherein low loss, small physical size, high reliability and good stability are necessary requirements. Of almost equal significance is the fact that the modulation efficiency using the subject device is much higher and is able to produce a modulation depth per watt that is higher by a factor of 2 as compared to devices fabricated from materials such as fused silica, which is the material most used in commercial mode-lockers. The greater modulation depth that is achievable with the present construction also results in narrower second harmonic output pulses and for this reason also produces a far more stable laser operation.

The pulse widths observed using the present construction are narrower than with any known prior art construction and the operation is substantially free of those instabilities that have plagued earlier designs such as phase state switches, relaxation oscillations, and pulse shape anomalies such as pulse peaking and other pulse distortions.

It is therefore a principal object of the present invention to provide an improved and much simplified laser device having both mode-lock and frequency doubling characteristics.

Another object is to achieve mode-locking and frequency doubling in a laser device such as a Nd:YAG laser device by the addition of a single element located in the laser cavity.

Another object is to achieve improved modulation depth characteristics in a mode-locked frequency doubled laser construction.

Another object is to improve the stability and reliability of laser devices.

Another object is to reduce loss in a laser construction having mode locked and frequency doubling characteristics.

Another object is to substantially reduce the size of laser devices used in laser communication and other systems.

Another object is to achieve improved mode-locked and frequency doubled laser operation using a single element mounted in a laser cavity, which element has acoustooptic characteristics as distinguished from electrooptic characteristics and operates as a loss modulator.

Another object is to at least double the modulator depth per watt characteristic of laser devices having mode-locked and frequency doubling characteristics.

Another object is to use a non-linear frequency doubling crystal such as a barium-sodium-niobate crystal to mode-lock and frequency double a laser.

Another object is to provide a more efficient laser source for use in laser communication systems and other similar devices.

Another object is to substantially simplify the construction of a Nd:YAG laser capable of operating as a mode-locked frequency doubling device.

Another object is to minimize phase state switching, impulse stretching and other distortions in laser operations.

These and other objects and advantages of the present invention will become apparent after considering the following detailed specification, which discloses preferred forms of the subject device in conjunction with the accompanying drawing, wherein:

FIG. 1 is a perspective view showing the external structural details of a laser assembly incorporating the features of the present invention;

FIG. 2 is a schematic diagram of an acoustooptic mode-locked frequency doubling crystal unit for use with the subject invention;

FIG. 3 is a schematic diagram of a laser device constructed according to the present invention;

FIG. 4 is a schematic diagram showing another embodiment of a laser resonator device incorporating means to mode-lock and frequency double the laser output; and, FIG. 5 is a side view partly broken away to show the internal construction of the laser device shown in FIG. 1.

Referring to the drawings more particularly by reference numbers, number 10 in FIG. 1 refers generally to a laser assembly constructed according to the present invention. The assembly 10 is contained in a housing 12 which has aligned input and output tubes 14 and 16, and is associated with a laser including a laser cavity 18 such as the laser cavity of Nd:YAG laser. In an actual construction the size of the housing 12 can be made to be as small as approximately two inches by two inches by one inch thick or even smaller. The container 12 has a mounting post 20 or other mounting provision and electrical connectors 22, 24, 26 and 28 provided on the housing 12 at the locations shown. During operation a laser beam passes through opening 30 in the housing tube 14 and through a crystal member located in the housing which may be a barium sodium niobate BSN crystal 32. The location of the crystal in the housing is shown more clearly in FIG. 5. The crystal 32 is at the heart of the present invention and is mounted between two thermally and electrically insulating nylon or similar type rods 34 and 36, and similar heater means such as boron nitride heaters 38 and 40 are positioned or slipped respectively onto the nylon rods 34 and 36. The heaters have high resistance coils which are energized to produce and maintain a desired operating temperature in the housing 12 and around the crystal 32. The heater coils are connected to a suitable source of heater voltage by the connections 22 and 24. The connections 26 and 28 are provided to make connection to thermister means 41 also located in the housing and provided to monitor the temperature therein and to control current flow to the heater coils to maintain a predetermined temperature condition. This is important to the operation but the means for accomplishing temperature control are well known and available and are not part of the present invention as such.

The crystal member 32 is held accurately between the heaters 38 and 40 by applying compressive force to the nylon rods 34 and 36 using screws or other means in the nylon rod holders located in the side walls of the housing 12. Heater coils 42 and 44 are shown wound on the two spaced boron nitride heater elements 38 and 40 and thermistors 46 for oven temperature control and a thermal couple 48 for crystal temperature monitoring are also provided.

Referring to FIG. 2, an acoustic transducer 50 is bonded to a side surface of the BSN crystal 32 by bonding means 52. The opposite side of the transducer from the side adjacent to the crystal has an electrode 54 attached thereto. The transducer 50 is driven by means of a small section of semirigid coaxial cable 56 which is shown as a piece of 50 Ω coaxial cable. One end of the coaxial cable 56 is connected to an outside mounting bulkhead 58 on the housing 12 and the opposite end of the cable is connected to an RF source shown as 250 MHz source 60. The front and rear optical faces of the crystal 32 are laser polished to be flat, parallel and anti-reflective coated at the frequency of the laser light which in case shown is 1.06 $\mu$m and 0.53 $\mu$m and these are the crystal faces 62 and 64 in FIG. 2. The RF source 60 produces acoustic standing waves in the crystal 32 which are illustrated by the dotted lines 66. Also as shown in FIG. 2 the crystal is oriented so that the incoming laser radiations enter at the Bragg angle $\theta_B$ and the principal output is labeled "Transmitted Beam," Another output labeled "Diffracted Beam" is wasted in the present construction. It is to be understood that there will be inputs and outputs to and from both opposite directions to and from the crystals in the present device.

In all acoustooptic mode-lockers, loss modulation is achieved by Bragg diffraction of the incident laser beam from an acoustic standing wave in the acoustooptic medium. This means that when a 1.06 $\mu$m laser beam propagates down the B-axis of the of the crystal 32 at the Bragg angle as shown in FIG. 2, it is polarized normal to the C-axis (see associated diagram of crystal axes orientations).

The transducer 50 is polished to a thickness such that the fundamental half wave thickness resonance occurs at 250 MHz. The RF energy fed to the transducer 50 at 250 MHz by the matching network 56 therefore excites the acoustic standing waves 66 in the crystal 32. The acoustic standing waves produce a relatively thick optical phase grating in the crystal for which the diffraction efficiency varies sinsuoidally at twice the frequency of the RF drive 60 or at 500 MHz. By the same token the diffraction loss produced in the crystal 32, which can be represented as $I_D/I_o$, can be calculated given several pertinent parameters as follows:

$$I_D/I_o = \sin^2\left\{\pi/\lambda_o \sqrt{2l/H}\, P_a M_2 \sin\omega t\right\}$$

In this equation:

$I_D$ is the intensity of the diffracted radiation,
$I_o$ is the intensity of the incident radiation,
$\lambda_o$ is the wave length of the incident radiation
$l$ is the length of the acoustic column,
H is the height of the acoustic column
$P_a$ is the one way circulating acoustic power, and
$M_2$ is a constant that represents an acoustooptic figure of merit.

It is to be further noted in connection with the structure shown in FIG. 2 that the peak loss as well as the zero loss occur twice during each cycle of the 250 MHz RF voltage applied to the transducer 50. The instantaneous diffraction loss is made up of a d.c. time average portion and the higher even harmonics of the 250 MHz RF drive. At relatively low acoustic power levels only the 500 MHz component is significant, but at peak diffraction losses greater than about 10 percent the modulation becomes peaked and distorted and useless for many purposes.

As already pointed out, the crystal 32 is a device which is mounted in a laser resonator such as in a Nd:YAG laser resonator to simultaneously achieve mode-locking and frequency doubling, for example, in the case of an infrared 1.064 μm laser to change the laser output from the infrared to the visible greenish range and to mode-lock the output. The laser in this as in other cases oscillates simultaneously at a number of different frequencies separated by the fundamental frequency c/2l as aforesaid. These frequencies correspond to the axial standing wave mode in the resonator. Normally, the different modes present oscillate independently and are not phase coherent. The laser output is therefore continuous but with fluctuations occurring at harmonics of the basic or fundamental frequency c/2l. In a mode-locked laser, a loss modulator is operated within the cavity at a frequency equal to the c/2l axial mode spacing and the modulation side bands serve to couple energy from one mode to the next so that ultimately a self-consistent phase locked situation is obtained. The time domain output of the laser consists of a series of spaced pulses at a frequency equal to c/2l.

Frequency doubling in a laser cavity is a parametric process whereby the infrared Nd:YAG fundamental radiation in the situation illustrated at 1.06 μm is converted to visible green radiation at 0.53 μm. The dielectric constant of barium sodium niobate (BSN) is non-linear at optical frequencies, and an electromagnetic (E/M) wave at the fundamental frequency produces a dielectric polarization component at twice the fundamental frequency. This harmonic polarization is the source of an electromagnetic wave at the harmonic frequency. The crystal 32 is oriented such that the harmonic (E/M) wave and the fundamental (E/M) wave propagate at the same velocity, i.e., are phase matched, and, as the beam propagates through the crysal, part of the fundamental beam is converted to second harmonic radiation, and this is the part that is coupled out of the laser by means of a dichroic mirror or other similar frequency separator. The advantage of frequency doubling is that the detectors that can be used are more sensitive in the visible output range, external modulation of the laser output is far easier to achieve, and the system optics involved can be much smaller. These are important advantages especially when designing a laser source for a communication system such as for a space communication system where it may be necessary for some units to be mounted in space vehicles where available space and weight limitations are critical. Use of a single one of the subject crystals accomplishes both the desired frequency doubling and the mode-locking and this has important advantages over other devices which require two or more separate elements to accomplish the same thing.

FIGS. 3 and 4 show several embodiments of Nd:YAG cavities 68 and 68A employing a single element crystal unit such as the crystal unit 32 shown and described above. The laser cavities 68 and 68A in each case includes a laser rod 70 and 70A which in the FIG. 4 construction is shown axially aligned and optically positioned between a Brewster window 72 and a lens 74. The resonator also includes a first resonator mirror 76 (or 76A) which is located on one side of the Brewster window and a second resonator mirror 78 (or 78A) which is shown located on the opposite side of the crystal unit 82 (or 82A). In the FIG. 3 construction the crystal unit and mirror 78 are located substantially on the axis of the laser rod 70 while in the FIG. 4 construction the mirror 78A and the crystal unit 82A are on a different axis than the axis of the laser rod 70A. The two resonator mirrors 76A and 78A in the FIG. 4 construction are maintained in optical communication with each other by means of another mirror such as folding mirror 80 oriented at an angle relative to the axis of the laser rod 70A so as to reflect the principal laser energy, which in the case illustrated is infrared energy at a 1.064 μm toward and through the BSN crystal 82A and from there to the resonator mirror 78A. The mirrors 78 and 78A may be dichroic mirrors which pass visible greenish radiation at 0.532 μm and reflect the infrared at 1.064 μm back through the crystal 82 (or 82A). The part of the energy at 0.532 μm that passes through the resonator mirror 78 or 78A forms the principal radiation output from the subject device. The other part of the laser energy at 1.064 μm which reaches the mirrors 78 and 78A but has not been converted by the crystal 82 to the higher frequency (lower wavelength) is reflected by the resonator mirror 78 or 78A and passes back through the crystal 82 (or 82A) and in so doing has an additional portion thereof converted to the higher frequency. The process is repeated and each time the laser beam passes through the crystal more of the radiation is converted to the higher frequency.

The folding mirror 80 in the FIG. 4 construction is able to pass the small additional shorter wavelengths (higher frequency energy) to another mirror 84 but it reflects the lower frequencies and redirects them back through the laser rod 70. These longer wave lengths that are reflected by the mirror 80 back through the laser are again reflected by the mirror 76 and the laser action described is repeated indefinitely.

The small amount of laser energy at 0.532 μm which impinges on the folding mirror 80 coming from the laser rod 70 as well as that coming from the resonator mirror 78A through the crystal 82A will pass through the folding mirror 80 and be directed toward the mirror 84 which produces a secondary laser output 86 also at 0.532 μm. If the device is constructed properly the 0.532 μm output at 86 will be substantially less than the same high frequency output from the resonator mirror 78A at 88, and for some applications the output at 86 is useful for control and synchronizing purposes. In FIG. 4 arrows are included to indicate the direction of travel of the laser energy at the different frequencies. Also one or both of the resonator mirrors 76 (or 76A) and 78 (or 78A) may be dichroic mirrors which are frequency selective to permit passage therethrough of one frequency while blocking passage and reflecting another frequency. These mirrors may also be constructed to reflect all of the energy that impinges thereon particularly the mirror 76.

The subject device including the laser means must be provided with suitable auxiliary equipment such as the cavity cooling and other means which are required to maintain the lasing rod at a desired operating temperature, and other temperature control means may also be required to control the temperature of the crystal 32 (or 82 and 82A). In a typical situation the crystal 32 is maintained at a temperature of about 90° ± 0.025° C. The RF drive for the crystal must also be controlled to within a relatively narrow band of input power such as to within about ± 5 mW, and this can be accomplished through the use of an automatic feedback loop or other similar means which are in existence.

The polarized operation of the subject laser can be obtained by using a thin quartz plate inserted into the resonator cavity at Brewster's angle. This functionally replaces the Brewster B Angle quartz modulator otherwise used to provide linear polarization of the laser. This plate can be removed, however, if the folding mirror 80 provides adequate polarization discrimination. The natural polarization selection occurs since there is a difference in the folding mirror loss for the two polarizations, and the low loss polarization will be selected. It is not entirely settled as to whether the quartz plate can be removed without detriment. The pumping of the laser can be accomplished by known means such as by a suitable lamp and this is not part of the present invention. The laser mirrors 76, (76A), 78, (78A), 80 and 84 are preferably mounted on ball and socket mirror mounts to facilitate adjustments of the device.

In operation, the crystal 32 (or 82 or 82A) is mounted to receive the optical output of the laser in the manner shown in FIGS. 2, 3 and 4, and the crystal 32 is excited by the RF source 60 and the matching network 56 which are coupled thereto by means of the transducer 50. This establishes the acoustic standing waves 66 in the crystal 32 which are shown in FIG. 2 of the drawing by dotted lines parallel to the crystal B axis orientation. The input laser energy which is continuous laser energy, is directed at the crystal 32 at the Bragg angle as shown in FIG. 2, and the output energy from the crystal which is under control of the applied RF source is a mode-locked laser beam otherwise described as a source of repetitive laser pulses at twice the frequency of the input laser energy. The mode-locking or modulating takes place due to the applied acoustic standing wave and the frequency doubling effect is simultaneously produced due to the characteristics of the crystal 32 as aforesaid. Being able to accomplish both of these desired results by using a single crystal element properly mounted in the laser cavity and properly controlled represents a significant and important advantage over all known means for accomplishing the same or similar results, and it does so with substantially improved operating stability. This makes the device more reliable than known devices and it can be made to be much smaller and more compact than any known device used for the same or similar purposes.

While the subject device has been described using the specific crystals of barium-sodium-niobate (BSN) and lithium niobate, other crystal substances having non-linear characteristics can also be used although probably with some sacrifice in the quality of the outputs they produce. One example of a crystal that can be used to produce a mode-locked output at an ultraviolet wavelength rather than at a visible fundamental wavelength is ammonium dihydrogen phosphate (ADP) used with an argon ion laser system. Another example is the use of a proustite crystal to frequency double and mode-lock a carbon monoxide (CO), a hydrogen fluoride (HF), a carbon dioxide ($CO_2$), or other similar infrared chemical or gas laser. Still another practical example of a laser mode-locker and frequency doubler is to use a strontium-barium-niobate (SBN) crystal with a solid state erbium:YAG laser.

The main difficulty for mode-locking and frequency doubling a laser system is that there are a very limited number of non-linear dielectric crystals available that will operate for a given system and the above examples, while capable of producing operative systems have some disadvantages which may limit their usefulness for certain purposes. Of those crystals that have been tested only BSN and LNB (lithium niobate) have been used with any substantial success is Nd:YAG lasers, although some degree of success has been enjoyed using lithium iodate ($LiIO_3$), alpha hydrogen diodate ($\alpha HIO_3$), lithium formate ($LiCHO_2$) and potassium dihydrogen phosphate (KDP). In general therefore, any laser can be mode-locked and frequency doubled using the disclosed technique given a suitable non-linear dielectric crystal.

Thus there has been shown and described improved means for mode-locking and simultaneously frequency doubling the output of a laser such as the output of a Nd:YAG laser, which means fulfills all of the objects and advantages sought therefor. It will be apparent to those skilled in the art, however, that many changes, modifications variations and other uses and applications of the subject device are possible and all such changes, modifications, variations and other uses and applications which do not depart from the spirit and scope of the invention are deemed to be covered by the invention which is limited only by the claims which follow.

What is claimed is:

1. A laser construction including a laser cavity and means in the cavity which when stimulated produce a laser output, said laser cavity having an optical axis and a pair of spaced reflectors positioned thereon, the improvement comprising means positioned in the laser cavity in optical communication with the laser output to mode-lock and frequency double the laser output, said means including an acoustooptical crystal member having mutually perpendicular crystalline axes one of which is oriented at the Bragg angle with respect to the optical axis of the laser, transducer means attached to a side surface of the crystal member that is substantially parallel to the optical axis of the laser, means for exciting the transducer at a frequency equal to one-half of the axial mode spacing ($c/2l$) for the laser cavity to establish an acoustic standing wave in the crystal member which produces loss modulation at a frequency of ($c/2l$), said crystal being selected from crystal materials that have non-linear characteristics so that it is capable of converting the laser energy of one wavelength to laser energy at half the said one wavelength.

2. The laser construction defined in claim 1 wherein the laser is a neodymium YAG laser and the crystal member is a barium-sodium-niobate crystal.

3. The laser construction defined in claim 1 wherein the laser is a neodymium YAG laser and the crystal member is a lithium niobate crystal.

4. The laser construction defined in claim 1 wherein the laser is a neodymium YAG laser and the crystal is a lithium iodate crystal.

5. The laser construction defined in claim 1 wherein the laser is a neodymium YAG laser and the crystal is an alpha-hydrogen-diodate crystal.

6. The laser construction defined in claim 1 wherein the laser is a neodymium YAG laser and the crystal is a lithium formate crystal.

7. The laser construction defined in claim 1 wherein the laser is a neodymium YAG laser and the crystal is a potassium dihydrogen phosphate crystal.

8. The laser construction defined in claim 1 wherein the laser is an argon ion laser and the crystal is an ammonium dihydrogen phosphate crystal.

9. The laser construction defined in claim 1 wherein the laser is a carbon monoxide laser and the crystal is a proustite crystal.

10. The laser construction defined in claim 1 wherein the laser is a hydrogen fluoride laser and the crystal is a proustite crystal.

11. The laser construction defined in claim 1 wherein the laser is a carbon dioxide laser and the crystal is a proustite crystal.

12. The laser construction defined in claim 1 including a Brewster window mounted in the laser cavity on the optical axis thereof.

13. The laser construction defined in claim 1 wherein at least one of the laser cavity reflectors is a dichroic mirror capable of reflecting laser energy of said one wavelength and of passing the laser energy of half said one wavelength.

14. The laser construction defined in claim 1 wherein the laser cavity includes a active laser member positioned on the optical axis between the spaced reflectors, one of said reflectors being oriented to reflect the laser output at said one wavelength back through the laser member.

15. The laser construction defined in claim 14 including a beam-folding mirror positioned in alignment with the optical axis in position to reflect the laser energy received from the laser member to one of said spaced reflectors.

16. In the laser construction defined in claim 1 means to maintain the temperature in the laser cavity at a predetermined temperature condition.

17. Means to simultaneously mode-lock and frequency double the output of a laser including a laser cavity defined by a pair of spaced reflector members arranged in optical communication and means for establishing a lasing condition between said spaced reflector members, the improvement comprising a crystal member positioned in the laser cavity in optical communication between the spaced reflectors, said crystal having an axis oriented at the Bragg angle with respect to the optical axis of the laser, said crystal member having non-linear characteristics at the frequency of the laser so as to double the frequency of laser energy passing therethrough, and means to excite the crystal member at a frequency equal to one-half of the axial mode spacing ($c/2l$) for the laser cavity to establish an acoustooptical standing wave therein which produces loss modulation at a frequency of ($c/2l$).

18. The means defined in claim 17 wherein the laser is a neodymium YAG laser and the crystal is selected from the group consisting of barium-sodium-niobate, lithium niobate, lithium iodate, alpha-hydrogen-diodate, lithium formate, and potassium dihydrogen phosphate.

19. The means defined in claim 17 wherein the means to excite the crystal member include transducer means attached to the crystal, and a source of radio frequency energy coupled to the transducer means.

20. Apparatus for producing a mode-locked laser beam having a frequency that is the second harmonic of the fundamental laser frequency comprising a laser oscillator including a laser medium and spaced mirrors defining a laser-resonant cavity of predetermined length determinative of the fundamental frequency of the laser beam, and a single acoustooptic crystal disposed within said cavity for simultaneously mode-locking said beam and for interacting with the latter to produce the optical second harmonic thereof, said crystal having an axis oriented at the Bragg angle with respect to the optical axis of the laser, and means for modulating said crystal including means to establish an acoustic standing wave in the crystal, said last named means including a crystal transducer attached to the crystal, a source of RF energy, and a transmission line coupling the RF source to the transducer to produce acoustooptical standing waves in the crystal at a frequency equal to one-half of the axial mode spacing ($c/2l$) for the resonant cavity which operates to loss modulate the laser beam.

* * * * *